United States Patent [19]

Krogmann et al.

[11] 4,075,764
[45] Feb. 28, 1978

[54] DEVICE FOR DETERMINING THE NORTH DIRECTION

[75] Inventors: Uwe Krogmann; Uwe Wurditsch, both of Uberlingen, Germany

[73] Assignee: Bodenseewerk Geratetechnik GmbH, Uberlingen (Bodensee), Germany

[21] Appl. No.: 731,024

[22] Filed: Oct. 8, 1976

[30] Foreign Application Priority Data

Apr. 29, 1976 Germany .............................. 2618868

[51] Int. Cl.² .............................................. G01C 19/38
[52] U.S. Cl. ...................................................... 33/324
[58] Field of Search .................. 33/324, 325, 275, 318

[56] References Cited

U.S. PATENT DOCUMENTS 3,750,300   8/1973   Tumback ............................. 33/324

*Primary Examiner*—Harry N. Haroian
*Attorney, Agent, or Firm*—Darbo & Vandenburgh

[57] ABSTRACT

A highly-amplified pickoff signal responding to positional deviations of a wire-suspended gyro are fed to a torquer connected to the gyro. In response to these the torquer exerts on the gyro a torque counteracting the gyro directing torque. The pickoff signals are sampled at time internals T and an analogue-digital converter produces therefrom a timed sequence of digital signals with each digital signal being proportioned to the pickoff signal at a time of sampling. This sequence of digital signals are fed to a digital filter which produces an output signal, indicative of the deviation, in accordance with the equation:

$$\overline{U_M}(nT) = \overline{U_M}((n-1)\cdot T) +$$

$$1/N \left[ U_M(nT) - U_M((n-N)\cdot T) \right]$$

where
$n$ is a consecutive whole number,
$\overline{U_M}(jT)$ the average value output at the time $jT$,
$U_M(jT)$ the digitalized measuring value at the time $jT$, and
$N$ a fixed whole number.

3 Claims, 2 Drawing Figures

DEVICE FOR DETERMINING THE NORTH DIRECTION

BACKGROUND AND SUMMARY OF THE INVENTION

The invention pertains to a device for determining the north direction comprising a wire-suspended gyro, a pickoff responding to deviations of the gyro from the zero position of the wire suspension, a torquer fixed to the gyro housing to which the highly-amplified pickoff signal is applied and which exerts on the gyro, about the suspension wire axis, a torque counteracting the gyro directing torque, and a measuring and indicating device for the deviation of the gyro spin axis from the north direction, sensitive to the amplified pickoff signal.

A wire-suspended gyro has a gyro directing torque tending to align the spin axis of the gyro to north. The transition of the gyro to the north direction requires much time. It is known to pick off the gyro deviations from the zero position of the wire suspension by means of a photoelectric pickoff and to apply the highly-amplified pickoff signal to a torquer which exerts a torque on the gyro housing about the suspension wire axis to counteract the deviation. A torque counteracting the gyro directing torque is therefore generated via the torquer and the gyro is thus caged to the zero position of the wire suspension when the gyro is about to drift from the zero position of the wire suspension under the influence of the gyro directing torque. The gyro directing torque is thus compensated by a countertorque. With an appropriate prealignment of the gyro and adequate amplification of the pickoff signal, this countertorque is then proportional to the angle formed by the zero position of the wire suspension and the north direction, in the same way as the gyro directing torque. As the torque is also proportional to the pickoff signal in accordance with the characteristic of the torquer, this signal is likewise proportional to the angle formed by the zero position of the wire suspension and the north direction.

Wire-suspended gyros are sensitive to vibrations. Difficulties are therefore encountered when using a device of the above mentioned kind on a base plate subject to vibrations, for example on a motor driven land vehicle. It could be tried to eliminate the disturbances by filtering the output signal, but such a filtering by means of conventional filters would again result in an unsatisfactory lengthening of the measuring period. In most instances it is important to obtain the indication of the north direction as quickly as possible.

The basic purpose of the invention is to provide a device for determining the north direction which can be used on supports subjected to vibrations, and also which quickly furnishes an indication of the north direction.

A prior invention (West German patent application No. P 25 45 026. 4; filed Oct. 8, 1975; entitled "Device For Determining North Direction; Uwe Krogmann, inventor) proposed a solution in which the measuring and indicating device included an analogue-digital converter for generating a digital signal proportional to the pickoff signal and a digital filter for the recurrent averaging of the digital signals sampled during the preset time intervals and for the immediate output of the last average value formed each time. By means of this averaging, any interferences of the measuring signal produced by vibrations were averaged out. By having the averaging recurrent, an indication of the north direction — possibly still faulty — was made quickly available, and then continuously improved. The average value was formed continuously taking into account all previous measured values by using the following recurrence formula $$\overline{U}_M(t_n) = \overline{U}_M(t_{n-1}) + K_n[U_M(t_n) - \overline{U}_M(t_{n-1})]$$

where $U_M(t_n)$ is the instantaneous measured value sampled at the time $t_n$ and $\overline{U}_M(t_n)$ the average value of all previous measured values sampled up to the time $t_n$. However, the cost to produce a digital filter operating according to the above mentioned recurrence formula is relatively high.

The basic purpose of the present invention is to provide a device of the type of the previous invention embodying a simplified digital filter without substantially reducing the filtering action and to further decrease the measuring time for the determination of the north direction. This is achieved by having the digital filter, which receives the digital signals sampled at time intervals T, produce an output signal in accordance with the equation:

$$\overline{U}_M(nT) = \overline{U}_M((n-1) \cdot T) + 1/N [U_M(nT) - U_M((n-N) \cdot T))]$$

where
n is a consecutive whole number,
$\overline{U}_M(jT)$ the average value output at the time $jT$,
$U_M(jT)$ the digitalized measuring value at the time $jT$,
and
N a fixed whole number.

In accordance with the invention, the digital filter continuously forms an average value. Only the last N measuring values are however considered in each case for this average value formation. A "value storage window" for N measuring values each time is displaced in a way on the time axis via the transient curves of the meridian gyro, and the average value of these N measuring values is formed recurrently.

In the recurrence formula on which the operation of the digital filter is based according to the previous invention supra, the expression in brackets with which the previous average value $\overline{U}_M(t_{n-1})$ must be corrected to obtain the actual average value $\overline{U}_M(t_n)$ includes the previous average value $\overline{U}_M(t_{n-1})$. This average value $\overline{U}_M(t_{n-1})$ therefore appears twice in the recurrence formula. The factor $K_n$ is time-controlled. For this reason it has to be computed either "on-line" or "off-line", and the $K_n$ factors are made available in a memory. The digital filter according to that invention is therefore rather elaborate.

In contrast to this the filter according to the present invention utilizes in the expression in brackets to be provided as correction for the previous average value $\overline{U}_M((n-1) T)$, only the instantaneous measuring values $U_M(nT)$ and $U_M((n - N) T)$, hence not even one average value. The factor 1/N before the bracket is a constant and corresponds practically to the reciprocal of the length of the "window" on which the averaging is based. It will therefore be seen that such a digital filter can be of simpler design than the filter according to the previous invention. It has been shown by means of a simulation performed with a digital computer for the purpose of investigating the response of the filter in accordance with the present invention to the effect of white noise and a slow sinusoidal disturbance that a suitable indication of the north direction can be obtained in a relatively short time with the digital filter in accordance with the invention.

DESCRIPTION OF SPECIFIC EMBODIMENT

Figure 1:
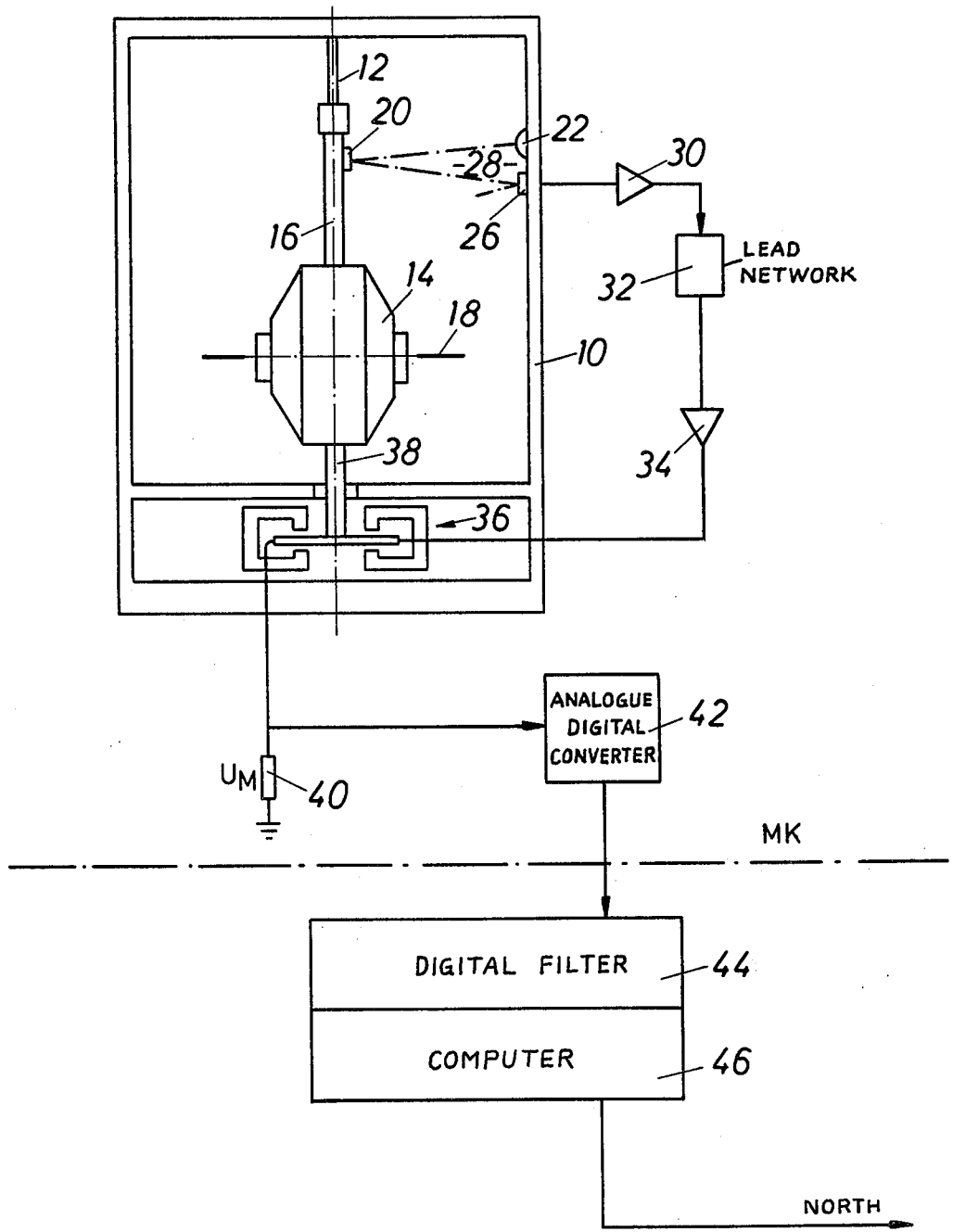
FIG. 1 schematically shows a device for determining the north direction.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The gyro is mounted in a housing 10. A suspension wire 12 supports the gyro from the housing. The gyro includes a housing 14 having a mast 16 to which the suspension wire is connected. The spin axis 18 of the gyro is horizontal. As a result of the rotation of the earth, a gyro directing torque tending to align the spin axis 18 to north acts on the gyro. Due to the fact that the gyro and its spin axis 18 are already approximately aligned to north, the gyro directing torque is proportional to the (small) angle between the spin axis 18 and the north direction.

A mirror 20 is mounted on the mast 16. A light source 22 emits a light beam 24 onto the mirror 20. The beam is reflected by the mirror onto a photodetector device 26. The light source 22, the mirror 20, and the photodetector device 26 form a photoelectric pickoff 28 which delivers a pickoff signal according to the displacement of the gyro from the zero position of the wire suspension.

The pickoff signal is applied to a torquer 36 via a preamplifier 30, a lead network 32, and an output amplifier 34. A rod 38 connects the armature of the torquer 36 to the gyro housing 14. Rod 38 is secured to the underside of the gyro housing 14 on the same axis as the mast 16. The torquer 36 exerts a torque on the housing 14, which torque counteracts the gyro directing torque so that the latter is practically compensated. The gyro is thus electrically caged to the zero position of the wire suspension. The torque and, as a result of the characteristic of the torquer 36, also the associated amplified pickoff signal are proportional to the angle between the spin axis 18 and north and therefore practically also to the angle formed by the zero position of the wire suspension and north.

The amplified pickoff signal is measured by means of the voltage drop $U_M$ on a measuring resistor 40 connected in series with the torquer 36. This voltage drop $U_M$ is proportional to the pickoff signal. The voltage drop $U_M$ is applied to an analogue-digital converter 42 which samples the voltage drop at time intervals T and produces a corresponding digital signal in the form of a 12 bit word. This digital signal is applied to a digital filter 44 which delivers an average value of the N last measuring values $U_M$ sampled each time by using the recurrence formula $$\overline{U}_M(nT) = \overline{U}_M((n-1) \cdot T) + 1/N [U_M(nT) - ((n-N) \cdot T)]$$

where $n$ is a consecutive whole number, $\overline{U}_M(jT)$ the average value output at the time $jT$, $U_M(jT)$ the digitalized measuring value at the time $jT$, and $N$ a fixed whole number.

In the selected embodiment: $N = 2^5 = 32$.

The resulting smoothed-out output value $\overline{U}_M(nT)$ is proportional to the gyro directing torque acting on the gyro. This torque is also proportional to the cosine of the geographical latitude. The conversion of the gyro directing torque into deviation from north is made in a computer 46.

Figure 2:
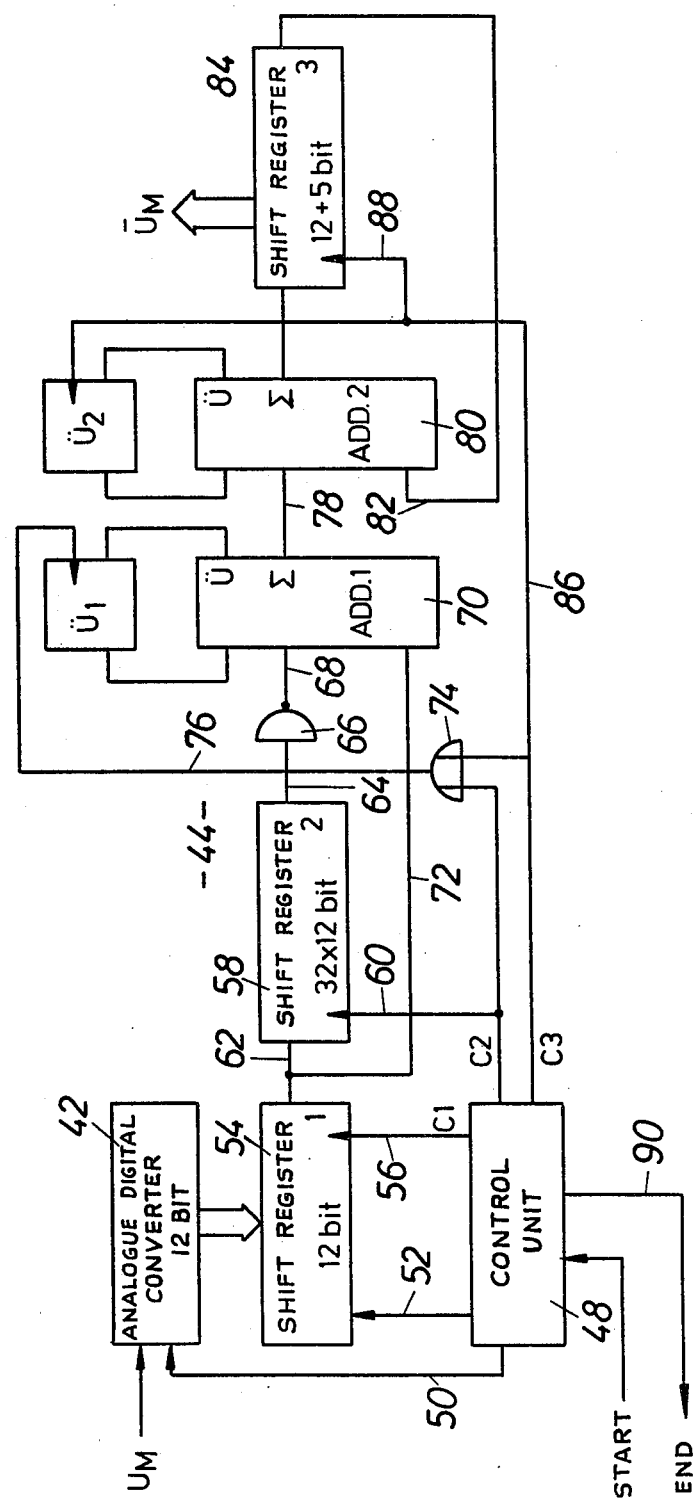
FIG. 2 shows the design of a digital filter used for the device according to FIG. 1.

FIG. 2 shows the design of the digital filter. At time intervals T a control unit 48, via a line 50, instructs the analogue-digital converter 42 to convert the measuring value $U_M$ into a 12 bit (sign included) data word. This data word is loaded parallel into a 12-bit first shift register 54. The data words stored in the first shift register 54 are successively transmitted into a second shift register by clock pulses $C_1$ given by the control unit 48 via line 56. The second shift register 58 has N × 12-digits, e.g., it contains 32 × 12 bits. It is stepped forward by clock pulses $C_2$ from the control unit 48 via line 60. When the individual bits of a data word $U_M(nT)$ are inserted into the input 62 of the second shift register 58, the corresponding bits of the data word $((n-N) \cdot T)$ exit at the same time from the output 64 thereof.

An inverter 66 connects the output 64 of the second shift register 58 to the input 69 of a first adder 70. A line 72 connects the output of the first shift register 54 to the second input of the first adder 70. The first adder 70 forms the difference between $U_M(nT)$ from the first shift register 54 and $U_M((n-N) \cdot T)$ from the second shift register 58. The formation of the difference occurs in the known manner by addition of the two's complement. For this purpose the data word coming from the shift register 58 is inverted via inverter 66 and a carry is added to the bit with the significance 2° by means of the clock pulses $C_2$ or $C_3$ via an OR gate 74 and line 76.

The difference obtained in this way is applied to a line 78 connected to the input of a second adder 80. The second input of the second adder 80 is connected via line 82 with the output of a third shift register 84. The output of the second adder 80 is inserted into the third shift register and controlled via lines 86 and 88 by means of the clock pulses $C_3$ of the control unit 48. The word length of the third shift register 84 of the described embodiment is 12 + 5 bit, i.e., it is larger than the word length of the shift register 54 and the data words $U_M$ by the power of two of the number N ($N = 2^5$). In this way the division of the difference $U_M(nT) - U_M((n-N) \cdot T)$ formed by the first adder 70 by N, e.g., $2^5$, is therefore possible. In this respect the adder 70 may be referred to as a data processing means.

The clock pulses $C_2$ and $C_3$ start at the same time. The third shift register 84 requires a sequence of 17 clock pulses. The old average value $U_M((n-1) \cdot T)$ is in the 12 more significant bit of the 17-bit third shift register 84. The difference from the first adder 70 is added to the 12 less significant bit positions, i.e., offset by five bit with respect to the old average value. This corresponds to a division of the difference by $2^5 = 32$, i.e., by N.

The length of the sum determined with the first adder 70 is 12 bit. After division by 32, i.e., N, the seven most significant digit positions are analyzed and added to the old average value $U_M((n-1) \cdot T)$ in the adder 80. On account of the number representation in the two's complement, this 7-bit data word must again be completed by five sign bit to 12 bit. For this purpose the second shift register 58 receives for the present, only 11 clock pulses so that up to the end of the second addition the sign bit of $U_M(nT)$ and $U_M(n-32)\cdot T)$ are applied to the first adder 70. The twelfth clock pulse of $C_2$ is delivered only after completion of the second addition in the adder 80. At the same time this twelfth clock pulse signals at the output 90 of the control unit 48 the end of the arithmetic operation and causes the parallel readout of the formed new average value $\overline{U}_M$.

We claim:

1. In an apparatus for determining the north direction comprising a gyro including a housing suspended by a wire, a pickoff responding to deviations of the gyro from a zero position of the wire suspension and producing pickoff signals, a torquer fixed to the gyro housing, means connecting the torquer and the pickoff to apply the pickoff signal highly-amplified to the torquer, said torquer exerting a torque on the gyro about the suspension wire axis counteracting the gyro directing torque, and a measuring device sensitive to the amplified pickoff signal to produce a signal indicative of angle between the gyro axis and north, said measuring device including an analogue-digital converter for producing a timed sequence of digital signals, each digital signal being proportional to the pickoff signal at the time of sampling, and digital filter means connected to said converter for forming a recurrent average value of the sequence of digital signals and for the immediate output of the last average value formed each time, the improvement comprising:

said filter means forms the average value of the digital signals sampled at time intervals T according to the equation $$\overline{U}_M(nT) = \overline{U}_M((n-1)\cdot T) + 1/N [\, U_M(nT) - U_M((n-N)\cdot T) \,]$$

where $n$ is a consecutive whole number,
$\overline{U}_M(jT)$ the average value output at the time $jT$,
$U_M(jT)$ the digitalized measuring value at the time $jT$, and
$N$ a fixed whole number.

2. In an apparatus as set forth in claim 1, wherein the digital filter means includes:

control means;

a first shift register connected to the analogue-digital converter and the control means for receiving said sequence, for storing a given number of the most recent signals of said sequence in the form of a data word $U_M(nT)$ for parallel transfer of the stored data word;

a second shift register having a word length which is N times that of the first shift register, connected to the control means, connected to the first shift register for the serial input of the data words of the first shift register, and for producing a data word corresonding to $U_M((n-N)\cdot T)$ and transferring it before N time intervals T;

a first adder connected to the two shift registers for the serial difference formation between the data word $U_M((n-N)\cdot T)$ transferred from the second shift register and the data word $U_M(nT)$ at the output of the first shift register;

a second adder having an input connected to the first adder to receive said serial difference, a second input and an output; and a third shift register with a word length increased by the logarithm of N to the basis 2 with respect to the word length of the first shift register, said third register having an input connected with the output of the second adder and an output connected to the second input of the second adder.

3. In an apparatus as set forth in claim 1, wherein the digital filter means comprises:

means for storing each sampled digital signal $U_M(n\cdot T)$ for N consecutive sampling intervals, wherein N is a fixed whole number, and having an output at which a stored sample digital signal $U_M((n-N)\cdot T)$ thereafter appears for further processing, data processing means for forming a difference divided by N of the instantaneous sampled digital signal $U_M(n\cdot T)$ and said stored sample digital signal $U_M((n-N)\cdot T)$, means for storing each average value for one sampling interval to produce a stored average value $\overline{U}_M((n-1)\cdot T)$, and adder means for adding said stored average value $\overline{U}_M((n-1)\cdot T)$ to said difference divided by N to produce said last average value $\overline{U}_M(n\cdot T)$.

* * * * *

UNITED STATES PATENT AND TRADEMARK OFFICE
CERTIFICATE OF CORRECTION

PATENT NO.    : 4,075,764
DATED         : February 28, 1978
INVENTOR(S)   : Uwe Krogmann; Uwe Wurditsch It is certified that error appears in the above-identified patent and that said Letters Patent are hereby corrected as shown below:

In the Abstract l. 14    "$U_M((n-N) \cdot T]$" should be
                         $--U_M((n-N) \cdot T)]--$ Col. 3, ls. 65-67        In the formula, second line, after the minus sign and before the term in parentheses insert $--[U_M(nT)-U_M--$ Col. 5, l. 4             "$U_M(n-32) \cdot T$" should be
                         $--U_M((n-32) \cdot T--$ Col. 5, l. 41            "at the time JT," should be
                         --at the time jT,--

Signed and Sealed this

Eleventh Day of July 1978

[SEAL]

Attest:

RUTH C. MASON
*Attesting Officer*

DONALD W. BANNER
*Commissioner of Patents and Trademarks*